(12) United States Patent
Han

(10) Patent No.: US 9,140,423 B2
(45) Date of Patent: Sep. 22, 2015

(54) MULTI-ARRAY LED CHIP FOR VEHICLE AND HEAD LAMP HAVING THE SAME

(71) Applicant: HYUNDAI MOBIS CO., LTD., Seoul (KR)

(72) Inventor: Seong Yeon Han, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 81 days.

(21) Appl. No.: 14/157,424

(22) Filed: Jan. 16, 2014

(65) Prior Publication Data

US 2015/0146448 A1    May 28, 2015

(30) Foreign Application Priority Data

Nov. 22, 2013 (KR) ........................ 10-2013-0142932

(51) Int. Cl.
*F21S 8/10* (2006.01)

(52) U.S. Cl.
CPC ........... *F21S 48/1154* (2013.01); *F21S 48/115* (2013.01); *F21S 48/1195* (2013.01); *F21S 48/1225* (2013.01)

(58) Field of Classification Search
CPC ............................ F21S 48/1195; F21S 48/115
See application file for complete search history.

(56) References Cited

U.S. PATENT DOCUMENTS

2004/0174712 A1* 9/2004 Yagi .............................. 362/475
2004/0240219 A1* 12/2004 Oishi et al. .................... 362/487

FOREIGN PATENT DOCUMENTS

| JP | 4024721 B2 | 12/2007 |
| KR | 10-2005-0103391 A | 10/2005 |
| KR | 10-0963966 B1 | 6/2010 |

* cited by examiner

*Primary Examiner* — Mary Ellen Bowman
(74) *Attorney, Agent, or Firm* — Knobbe Martens Olson & Bear, LLP

(57) ABSTRACT

The present invention relates to a multi-array chip for a vehicle, including a plurality of LED element having different sizes arranged and installed to emit light, and a head lamp having the multi-array chip for a vehicle. Accordingly, with variable LED elements which are individually turned on and off so as to correspond to a location of an oncoming vehicle, and have different sizes, visibility at the front side of a vehicle may be secured, and light blindness to a driver in the oncoming vehicle, may be prevented.

19 Claims, 7 Drawing Sheets

SCREEN ANGLE ACCORDING TO DISTANCE

MULTI-ARRAY LED CHIP FOR VEHICLE AND HEAD LAMP HAVING THE SAME

CROSS-REFERENCE TO RELATED APPLICATIONS

This application claims priority to and the benefit of Korean Patent Application No. 10-2013-0142932 filed in the Korean Intellectual Property Office on Nov. 22, 2013, the entire contents of which are incorporated herein by reference.

TECHNICAL FIELD

The present invention relates to a multi-array LED chip for a vehicle and a head lamp having the same, and more particularly, to a multi-array LED chip for a vehicle and a head lamp having the multi-array LED chip which is installed in the head lamp of the vehicle to prevent light blindness to a driver in an oncoming vehicle, and to improve visibility for a driver in a vehicle.

BACKGROUND ART

In general, lighting devices are provided in a vehicle in order to stably secure visibility of a driver even when illumination is low at the periphery of the vehicle at the time of driving a vehicle, and among the lighting devices, an LED head lamp using a light emitting diode (LED) as a light source of a head lamp has been developed.

Here, the LED is a diode that emits excess energy as light when injected electrons and holes are coupled again, emits red light or green light, and is mainly used as a light source using advantages of low pressure and low electric power consumption.

Particularly, an LED array is a type of a light source formed by mounting a plurality of LEDs, and may directly implement various beam patterns by selectively turning on the plurality of LEDs.

Therefore, the LED array may be applied to a head lamp and a rear lamp of the vehicle so as to be effectively used to implement various beam patterns.

In this regard, as a related art, there is Korean Patent Application Laid-Open No. 10-2005-0103391 entitled 'Light Distribution Structure of LED Head Lamp for Vehicle'.

In the light distribution structure of an LED head lamp for a vehicle, a light concentration structure of the LED head lamp is described, as illustrated in FIG. 1.

When describing the light concentration structure of the LED head lamp with reference to FIG. 1, a light concentration structure 10 of the LED head lamp may include an LED light source 11, a reflection mirror 12 which adjusts a direction of light from the LED light source 11, a lens 13 which protects the LED light source 11, and a shade or shield 14 which cuts off light emitted toward an opposite vehicle so as to prevent light blindness to a driver in an oncoming vehicle.

However, an L-shaped beam pattern, which is implemented by the shield 14, may implement a glare free high beam on the basis of both interfaces of left and right head lamps, but there is a drawback in that visibility deteriorates because the light corresponding to an intermediate region exists as a dark zone|[s1]. There is a problem in that light efficiency is decreased due to light shielding when the shield 14 is used.

Accordingly, as a light source of the head lamp for a vehicle, an LED light source, which directly emits light to the lens 13, is used.

LED elements, which are used as the LED light source, are designed to have the same size, and emit light to a front side of the vehicle.

Particularly, when a high beam is emitted to an oncoming vehicle or a preceding vehicle using the LED elements installed to have the same size, the LEDs disposed in a predetermined region are turned on and off. Here, the oncoming vehicle refers to a vehicle that moves toward another moving vehicle while facing the moving vehicle, and the preceding vehicle means a vehicle that precedes the moving vehicle on a road on which the moving vehicle moves.

However, as illustrated in FIG. 2, when the high beam is emitted so as to correspond to a location of an oncoming vehicle 3 or a preceding vehicle 4, the LED elements having the same light emitting area are turned on and off, and thereby, the LED element has a limit to implement a function of preventing light blindness.

That is, as illustrated in FIG. 2, there is a problem in that when the LED elements having the same light emitting area are turned on and off so as to correspond to a location where the oncoming vehicle 3 moves, even though the LED elements, which corresponds to an excessive region in order to screen the oncoming vehicle 3, are turned on and off so as to prevent light blindness to the driver in the oncoming vehicle 3, visibility of a driver in the moving vehicle 2 deteriorates.

When describing in more detail with reference to FIGS. 2 and 3, in the case of light A emitted to the oncoming vehicle 3 positioned at a distal location, a screen angle of the light emitted from the vehicle 2 becomes narrow. As the oncoming vehicle 3 moves, the screen angle of the light emitted from the vehicle 2 is increased like light B.

That is, the screen angle for preventing light blindness against the oncoming vehicle 3 is slowly increased in a range of 1,000 to 200 m, and then rapidly increased from a location of 200 m.

Therefore, in a case in which the moving vehicle 2 has the LED elements having the same light emitting area as the light source, it is possible to prevent light blindness to the driver in the oncoming vehicle 3 when the oncoming vehicle 3 is moving, but there is a problem in that visibility of the driver in the vehicle 2.

SUMMARY OF THE INVENTION

The present invention has been made in an effort to provide a multi-array LED chip for a vehicle and a head lamp having the multi-array LED chip which secure visibility at a front side and prevent light blindness to a driver in a vehicle moving at the front side by controlling a plurality of LED elements having different sizes to be individually turned on and off.

The present invention has been made in an effort to provide a multi-array LED chip for a vehicle and a head lamp having the multi-array LED chip capable of improving light efficiency by varying sizes of LED elements that are individually turned on and off so as to correspond to a location of a vehicle moving at a front side.

An exemplary embodiment of the present invention provides a multi-array LED chip for a vehicle, including a plurality of LED elements arranged and installed to emit light, in which widths of the LED elements are increased in a width direction on the basis of a center of the light.

The LED elements may include central LED elements, and variable LED elements arranged at both sides of the central LED elements, and widths of the variable LED elements may be increased in the width direction on the basis of the center of the light.

The plurality of LED elements may be arranged in at least two rows.

The LED elements may be individually turned on and off.

Another exemplary embodiment of the present invention provides a multi-array LED chip for a vehicle, including a plurality of LED elements arranged and installed to emit light, in which heights of the LED elements are decreased in a width direction on the basis of a center of the light.

The LED elements may include central LED elements, and variable LED elements arranged at both sides of the central LED elements, and heights of the variable LED elements may be decreased in the width direction on the basis of the center of the light.

The LED elements may be individually turned on and off.

Yet another exemplary embodiment of the present invention provides a multi-array LED chip for a vehicle, including a plurality of LED elements arranged and installed to emit light, in which widths of the LED elements are increased and heights of the LED elements are decreased in a width direction on the basis of a center of the light.

The LED elements may include central LED elements, and variable LED elements arranged at both sides of the central LED elements, and widths of the variable LED elements may be increased and heights of the variable LED elements are decreased in the width direction on the basis of the center of the light.

The LED elements may be individually turned on and off.

Still another exemplary embodiment of the present invention provides a head lamp including: the aforementioned multi-array LED chip for a vehicle; and a lens installed on a light emission line of light emitted from the multi-array LED chip for a vehicle.

The lens may be an aspherical lens.

The head lamp may further include a primary optic installed on the light emission line between the multi-array LED chip for a vehicle and the lens.

The multi-array LED chip for a vehicle and the head lamp having the multi-array LED chip for a vehicle according to the exemplary embodiment of the present invention, which have the aforementioned configuration, secure visibility at a front side and prevent light blindness to a driver in a vehicle moving at the front side by controlling a plurality of LED elements having different sizes to be individually turned on and off.

Particularly, light efficiency of the head lamp may be improved by varying sizes of the LED elements that are individually turned on and off so as to correspond to a location of the vehicle moving at a front side.

The LED elements, which are arranged in at least two rows, are individually turned on and off so as to correspond to an oncoming vehicle that approaches a front side of the vehicle, thereby improving light efficiency of the vehicle.

The head lamp having the multi-array LED chip for a vehicle according to the exemplary embodiment of the present invention includes a primary optic, thereby improving light quality by concentrating light emitted from the multi-array LED chip for a vehicle into a center, or allowing the light to uniformly enter a lens.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
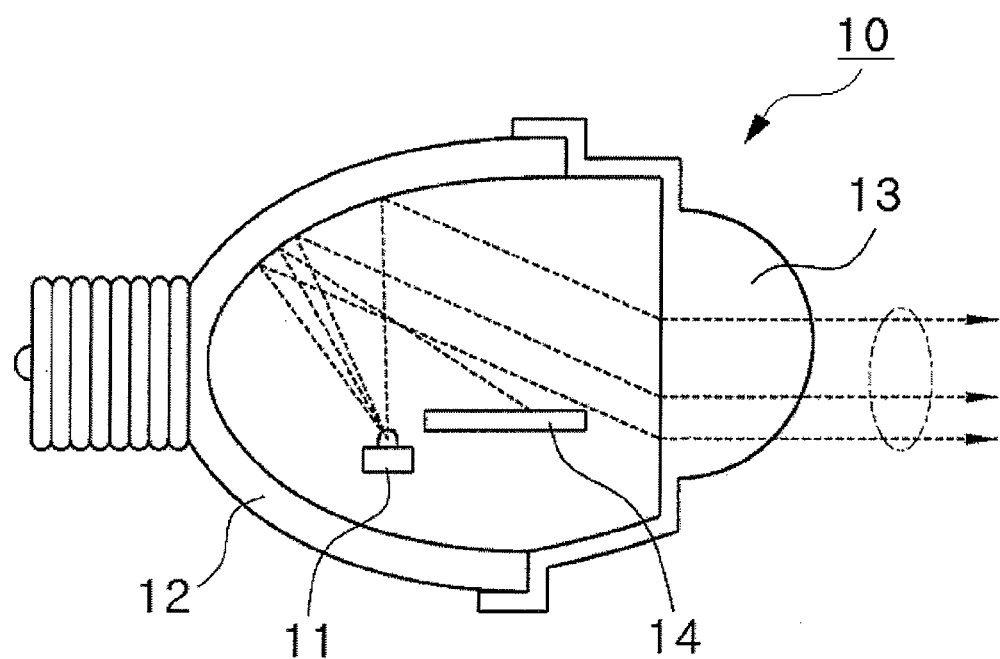
FIG. 1 is a view illustrating a light distribution structure of an LED head lamp for a vehicle in the related art.
Figure 2:
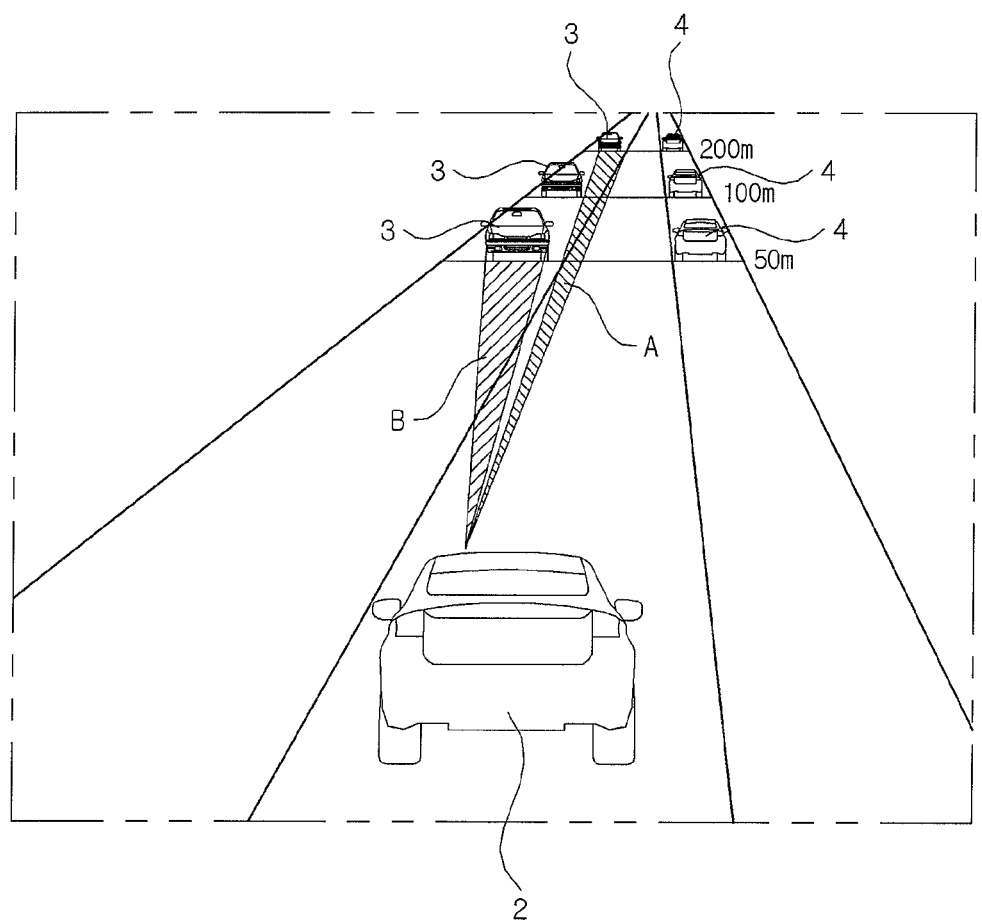
FIG. 2 is a view illustrating a relationship between a moving vehicle and an oncoming vehicle or a preceding vehicle.
Figure 3:
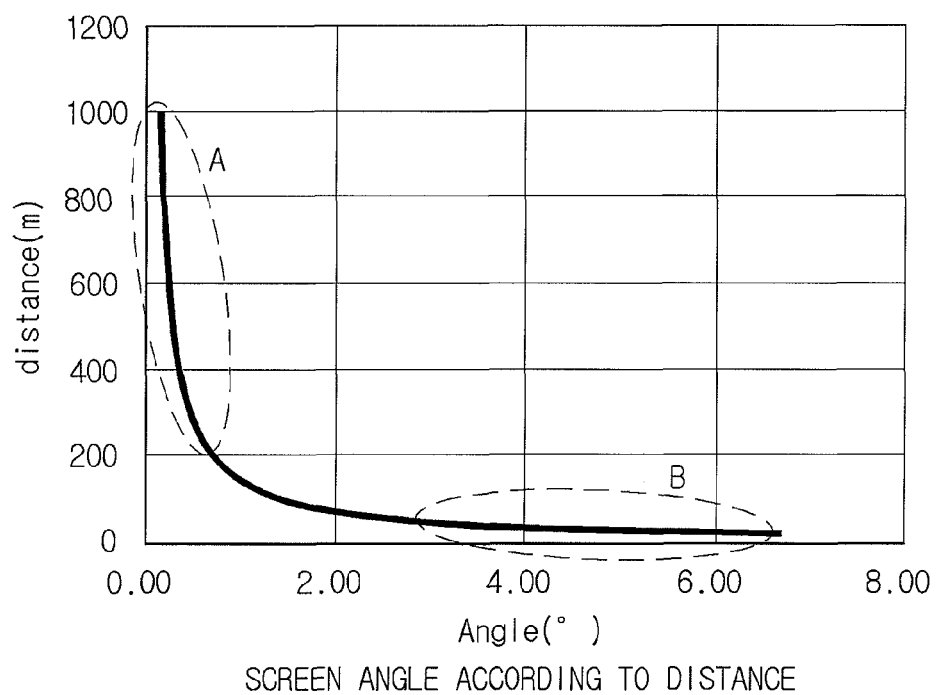
FIG. 3 is a view illustrating a screen angle with respect to an oncoming vehicle.
Figure 4:
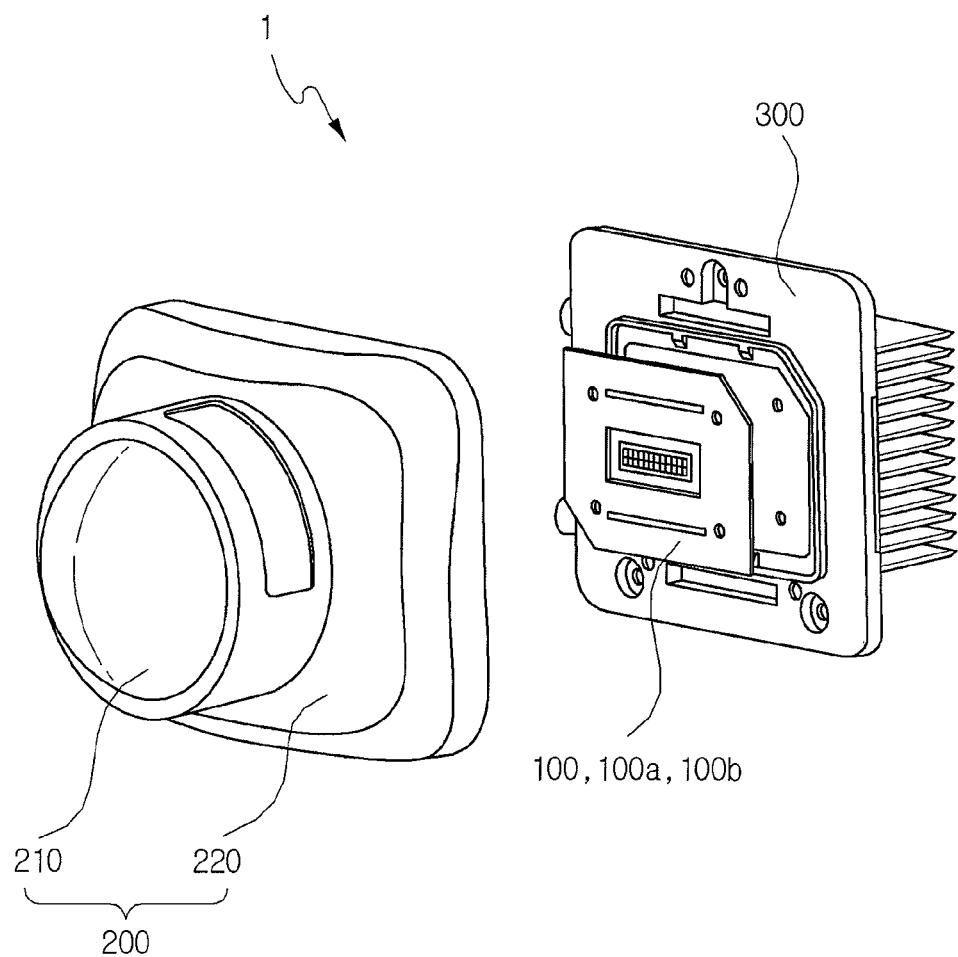
FIG. 4 is a view illustrating a multi-array LED chip for a vehicle according to an exemplary embodiment of the present invention and a head lamp having the multi-array LED chip.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, the exemplary embodiments of the present invention will be described in detail with reference to the accompanying drawings in order to clarify a method of solving the technical problems of the present invention. However, in the description of the present invention, descriptions of publicly-known related technologies incorporated herein will be omitted when it is determined that the descriptions of the publicly-known related technologies may obscure the subject matter of the present invention. The terms used in the following description are defined considering the functions of the present invention and may vary depending on the intention or usual practice of a designer or manufacturer. Therefore, the definitions should be made based on the entire contents of the present specification. Parts indicated by like reference numerals (reference numbers) refer to like elements throughout the specification.

Hereinafter, a multi-array LED chip for a vehicle according to the exemplary embodiment of the present invention and a head lamp having the multi-array LED chip will be described.

Referring to FIGS. 4 to 8, a head lamp 1 having a multi-array LED chip for a vehicle may include a multi-array LED chips 100, 100a, and 100b for a vehicle, a lens part 200, and a heat radiating part 300.

The multi-array LED chips 100, 100a, and 100b for a vehicle are installed in the head lamp 1 and emit light as a light source.

As illustrated in FIGS. 5 to 8, a plurality of LED elements 110, 110a, and 110b is arranged and installed on the multi-array LED chips 100, 100a, and 100b for a vehicle.

That is, the LED elements 110, 110a, and 110b are aligned and installed on a vertical plane based on a light emission direction.

Hereinafter, the LED elements 110, 110a, and 110b and the multi-array LED chips 100, 100a, and 100b for a vehicle will be described with reference to FIGS. 5 to 8.

Figure 5:
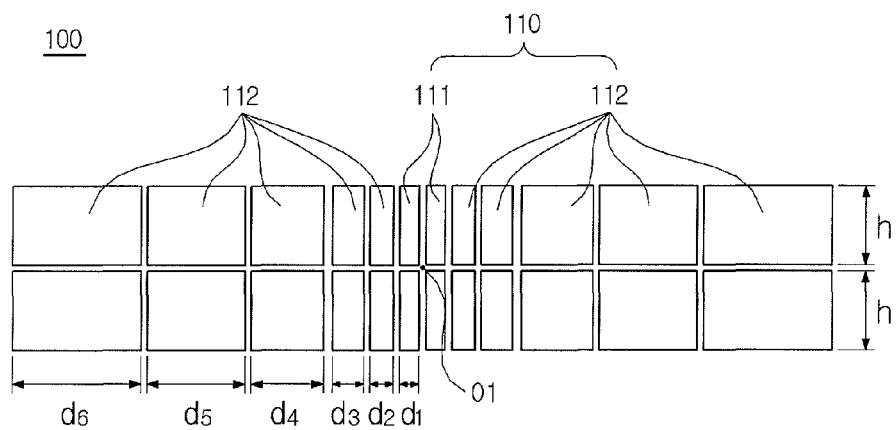
FIGS. 5 to 8 are views illustrating exemplary embodiments of LED elements that are installed on the multi-array LED chip for a vehicle according to the exemplary embodiment of the present invention.

Referring to FIG. 5, the LED elements 110 may include central LED elements 111 installed at a center O1 side of the light, and a plurality of variable LED elements 112 disposed at both sides of the central LED elements 111.

The plurality of LED elements 110 may be installed to have widths $d_1$, $d_2$, $d_3$, $d_4$, $d_5$, and $d_6$ that are increased in a width direction of the multi-array LED chip 100 for a vehicle on the basis of the center O1 of the light. That is, the plurality of LED elements 110 may be installed to have the widths $d_1, d_2, d_3, d_4, d_5,$ and $d_6$ that are decreased as being closer to, the center O1 of the light.

As illustrated in FIG. 5, the central LED elements 111 are disposed at the center O1 side of the light. The plurality of variable LED elements 112 having the increased widths $d_2, d_3, d_4, d_5,$ and $d_6$ may be disposed at both sides on the basis of the central LED elements 111 having the width $d_1$.

Here, $d_1$ may be 0.4±0.2 mm, $d_2$ may be 0.6±0.2 mm, $d_3$ may be 0.8±0.2 mm, $d_4$ may be 1.0±0.2 mm, $d_5$ may be 2.5±0.2 mm, and $d_6$ may be 4.0±0.2 mm. The LED elements 110 have the same height h of 2.0±0.2 mm.

Therefore, the central LED elements 111, which has the width $d_1$ corresponding to an oncoming vehicle 3, are turned off when the oncoming vehicle 3 is positioned at a distal location, and the variable LED elements 112, which have the widths $d_2, d_3, d_4, d_5,$ and $d_6$ in a direction toward the oncoming vehicle 3, are sequentially turned off as the oncoming vehicle 3 approaches a vehicle 2, thereby preventing light blindness to a driver in the oncoming vehicle 3.

The present invention exemplifies the LED elements 110 having the different widths $d_1, d_2, d_3, d_4, d_5,$ and $d_6$, as illustrated in FIG. 5, but the present invention is not particularly limited thereto, and the number of LED elements 110 may vary depending on the head lamp 1 that is installed in the vehicle 2.

Accordingly, as described above, the LED elements 110, which have the widths that are increased in the width direction of the multi-array LED chip 100 for a vehicle on the basis of the center O1 of the light, are sequentially turned on and off so as to correspond to a screen angle for the oncoming vehicle 3, thereby preventing light blindness to the driver in the oncoming vehicle 3 and improving light efficiency of the vehicle 2. Therefore, visibility of a driver in the vehicle 2 may be secured.

Figure 6:
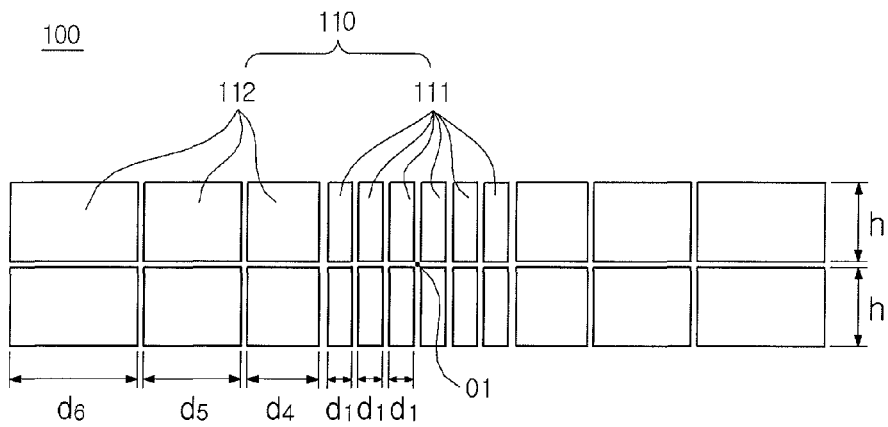

As illustrated in FIG. 6, the plurality of central LED elements 111 is disposed at the center O1 side of the light. The plurality of variable LED elements 112 having the increased widths $d_4, d_5,$ and $d_6$ may be disposed at both sides on the basis of the plurality of central LED elements 111 having the width $d_1$.

Here, $d_1$ may be 0.4±0.2 mm, $d_4$ may be 1.0±0.2 mm, $d_5$ may be 2.5±0.2 mm, and $d_6$ may be 4.0±0.2 mm. The LED elements 110 have the same height h of 2.0±0.2 mm.

The screen angle for preventing light blindness against the oncoming vehicle 3 is slowly increased within a range of 1,000 to 200 m, and thus, the central LED elements 111, which have the same width so as to correspond to the range of 1,000 to 200 m, may be disposed. The screen angle for preventing light blindness against the oncoming vehicle 3 is rapidly increased from a location of 200 m, and thus, the plurality of variable LED elements 112, which has the widths $d_4, d_5,$ and $d_6$ that are increased to correspond to the screen angle, is disposed, thereby efficiently preventing light blindness to the driver in the oncoming vehicle 3.

Accordingly, the central LED elements 111, which have the width $d_1$ corresponding to the oncoming vehicle 3, are turned on and off, thereby improving visibility of the driver in the vehicle 2. As the oncoming vehicle 3 approaches the vehicle 2, the variable LED elements 112 having the widths $d_4, d_5,$ and $d_6$ are sequentially turned on and off, thereby preventing light blindness to the driver in the oncoming vehicle 3 and securing visibility at a front side of the vehicle 2.

Meanwhile, as illustrated in FIGS. 5 and 6, the LED elements 110 may be arranged in at least two rows.

Therefore, in order to efficiently prevent light blindness to the driver in the oncoming vehicle 3 and secure light efficiency, only the LED elements 110, which correspond to the screen angle for the oncoming vehicle 3 and are positioned at an upper side, may be turned off. Of course, the LED elements 110, which are positioned at a lower side, may also be turned off depending on a size and an approaching location of the oncoming vehicle 3.

That is, the screen angle for the oncoming vehicle 3 is increased in a height direction as well as the width direction as the oncoming vehicle 3 approaches the vehicle 2, and thus, only the LED elements 110, which are positioned at the upper side, are turned off when the oncoming vehicle 3 is positioned at a distal location, thereby securing light efficiency.

However, in a case in which the LED elements 110, which are positioned at the lower side, need to be turned off as the oncoming vehicle 3 approaches the vehicle 2, the LED elements 110, which are positioned at the upper side, may also be turned off, thereby preventing light blindness to the driver in the oncoming vehicle 3.

Therefore, the head lamp 1 may prevent light blindness to the driver in the oncoming vehicle 3 and improve light efficiency of the vehicle 2 as the oncoming vehicle 3 approaches, thereby securing a visual range of the driver in the vehicle 2.

Here, a circuit is designed so that each of the LED elements 110 may be individually turned on and off, and then the LED elements 110 may be installed on the multi-array LED chip 100 for a vehicle. Accordingly, each of the LED elements 110 may be individually turned on and off and may be individually inspected.

Figure 7:
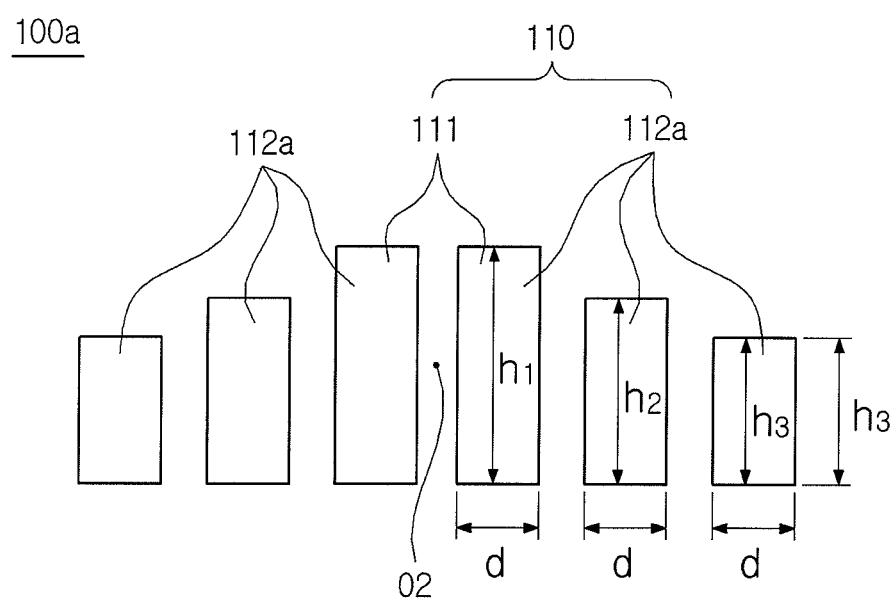

Meanwhile, referring to FIG. 7, as for the LED elements 110a, a plurality of LED elements 110a, which has heights $h_1, h_2,$ and $h_3$ that are decreased in the width direction of the multi-array LED chip 100a for a vehicle on the basis of the center O2 of the light, may be installed.

Here, $h_1$ may be 4.0±0.2 mm, $h_2$ may be 3.0±0.2 mm, and $h_3$ may be 2.0±0.2 mm. The LED elements 110a have the same width d of 0.5±0.2 mm.

Therefore, the screen angle for the oncoming vehicle 3 is increased in the height direction as well as the width direction as the oncoming vehicle 3 approaches the vehicle 2, and thus, the LED elements 110a, which have heights that are increased toward a center O2 of the light, are disposed, such that the head lamp 1 may secure visibility of the driver in the vehicle 2.

As illustrated in FIG. 7, the LED elements 110a may include central LED elements ill installed at the center O2 side of the light, and a plurality of variable LED elements 112a disposed at both sides of the central LED elements 111.

In the case of the variable LED elements 112a illustrated in FIG. 7, heights $h_2$ and $h_3$ of the variable LED elements 112a become smaller than a height $h_1$ of the central LED elements 111 in the width direction of the multi-array LED chip 100a for a vehicle on the basis of the center O2 of the light.

That is, unlike the multi-array LED chip 100 on which the LED elements are arranged in at least two rows, in the multi-array LED chip 100a, the central LED elements 111 are disposed at the center O2 side of the light, and the variable LED elements 112a, which have the heights that are decreased in the width direction, are disposed at both sides of the central LED elements 111, thereby securing visibility of the driver when the LED elements 110a are individually turned on and off.

As illustrated in FIG. 7, the present invention exemplifies the six LED elements 110a having varied heights, but the present invention is not particularly limited thereto, and the number of LED elements 110a may vary depending on the head lamp 1 that is installed in the vehicle 2.

Figure 8:
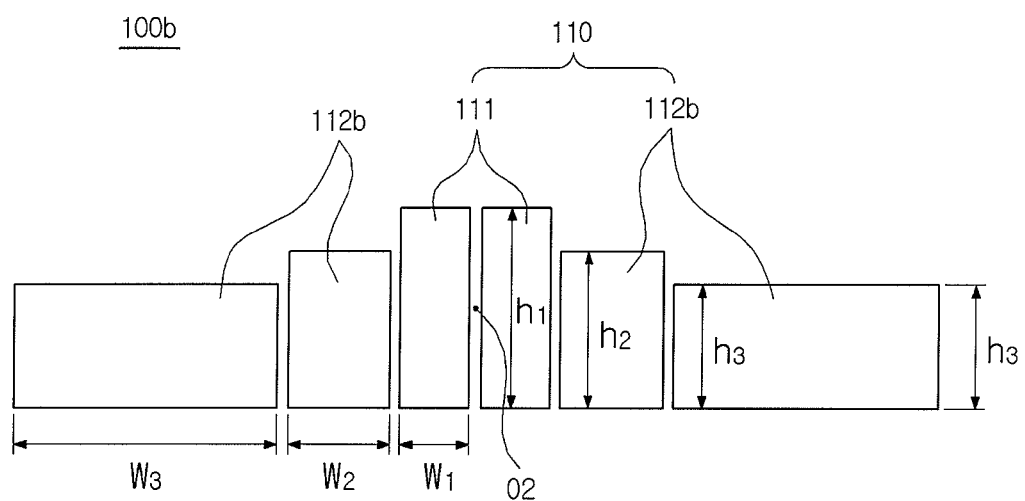

Meanwhile, as illustrated in FIG. 8, as for the LED elements 110b, plurality of LED elements 110b, which has widths that are increased and heights $h_1$, $h_2$, and $h_3$ that are decreased in the width direction of the multi-array LED chip 100b for a vehicle on the basis of the center O2 of the light, may be installed.

Here, $h_1$ may be 4.0±0.2 mm, $h_2$ may be 3.0±0.2 mm, $h_3$ may be 2.0±0.2 mm, $w_1$ may be 0.5±0.2 mm, $w_2$ may be 1.0±0.2 mm, and $w_3$ may be 3.0±0.2 mm.

Therefore, the screen angle for the oncoming vehicle 3 is increased in the height direction as well as the width direction as the oncoming vehicle 3 approaches the vehicle 2, and thus, the LED elements 110b, which have the widths that are decreased toward the center O2 of the light and the heights that are increased toward the center O2 of the light, are disposed, such that the head lamp 1 may prevent light blindness to the driver in the oncoming vehicle 3 and secure visibility of the driver in the vehicle 2.

As illustrated in FIG. 8, the LED elements 110b may include central LED elements 111 installed at the center O2 side of the light, and a plurality of variable LED elements 112b disposed at both sides of the central LED elements 111.

Intervals at which light is not emitted exist between the LED elements 110a, and light efficiency may deteriorate due to the intervals. Therefore, unlike the LED elements 110a illustrated in FIG. 7, the LED elements 110b illustrated in FIG. 8 have the widths that are increased, and the heights $h_1$, $h_2$, and $h_3$ that are decreased in the width direction, thereby further improving light efficiency when the oncoming vehicle 3 is positioned at a proximal location.

As illustrated in FIG. 8, the present invention exemplifies the six LED elements 110b having varied widths and heights, but the present invention is not particularly limited thereto, and the number of LED elements 110b may vary depending on the head lamp 1 that is installed in the vehicle 2.

The lens part 200 is installed on a light emission line of light emitted from the multi-array LED chips 100, 100a, and 100b for a vehicle. Here, the lens part 200 may include a lens holder 220 that fixes a lens 210 and a lens 210. Here, the lens 210 may be an aspherical lens.

Accordingly, the light emitted from the multi-array LED chips 100, 100a, and 100b for a vehicle is guided into an irradiation range of the lens 210.

The heat radiating part 300 may be provided to cool heat generated when the multi-array LED chips 100, 100a, and 100b for a vehicle emit light.

The heat radiating part 300 has a plurality of heat radiating fins (a reference numeral is omitted) so as to disperse and cool heat generated from the multi-array LED chips 100, 100a, and 100b for a vehicle.

Meanwhile, the head lamp 1 may further include a primary optic.

The primary optic may be installed between the multi-array LED chips 100 and 100a for a vehicle and the lens 210. That is, the primary optic is positioned on a light emission line of the multi-array LED chips 100 and 100a for a vehicle. The primary optic may concentrate light emitted from the multi-array LED chips 100, 100a, and 100b for a vehicle into a center, or may diffuse light emitted to an unnecessary portion. The primary optic may improve light efficiency using refraction and reflection, and may improve light quality by allowing the light to uniformly enter the lens 200.

Therefore, the primary optic may improve light quality of the light emitted from the head lamp 1.

The head lamp 1 has been described in association with the oncoming vehicle 3, but even in the case of a preceding vehicle 4 that is a vehicle which precedes the vehicle 2 on a road on which the vehicle 2 moves, the head lamp 1 may be identical depending on a location of the preceding vehicle 4.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A multi-array LED chip for a vehicle, comprising:
a plurality of LED elements arranged and installed to emit light,
wherein widths of the LED elements are increased in a width direction on the basis of a center of the light.

2. The multi-array LED chip of claim 1, wherein the LED elements include central LED elements, and variable LED elements arranged at both sides of the central LED elements, and widths of the variable LED elements are increased in the width direction on the basis of the center of the light.

3. The multi-array LED chip of claim 2, wherein the plurality of LED elements is arranged in at least two rows.

4. The multi-array LED chip of claim 3, wherein the LED elements are individually turned on and off.

5. A multi-array LED chip for a vehicle, comprising:
a plurality of LED elements arranged and installed to emit light,
wherein heights of the LED elements are decreased in a width direction on the basis of a center of the light.

6. The multi-array LED chip of claim 5, wherein the LED elements include central LED elements, and variable LED elements arranged at both sides of the central LED elements, and heights of the variable LED elements are decreased in the width direction on the basis of the center of the light.

7. The multi-array LED chip of claim 6, wherein the LED elements are individually turned on and off.

8. A multi-array LED chip for a vehicle, comprising:
a plurality of LED elements arranged and installed to emit light,
wherein widths of the LED elements are increased and heights of the LED elements are decreased in a width direction on the basis of a center of the light.

9. The multi-array LED chip of claim 8, wherein the LED elements include central LED elements, and variable LED elements arranged at both sides of the central LED elements, and widths of the variable LED elements are increased and heights of the variable LED elements are decreased in the width direction on the basis of the center of the light.

10. The multi-array LED chip of claim 9, wherein the LED elements are individually turned on and off.

11. A head lamp comprising:
the multi-array LED chip for a vehicle of claim 1; and
a lens installed on a light emission line of light emitted from the multi-array LED chip for a vehicle.

12. The head lamp of claim 11, wherein the lens is an aspherical lens.

13. The head lamp of claim 11, further comprising:
a primary optic installed on the light emission line between the multi-array LED chip for a vehicle and the lens.

14. A head lamp comprising:
the multi-array LED chip for a vehicle of claim 5; and
a lens installed on a light emission line of light emitted from the multi-array LED chip for a vehicle.

15. The head lamp of claim 14, wherein the lens is an aspherical lens.

16. The head lamp of claim 14, further comprising:
a primary optic installed on the light emission line between the multi-array LED chip for a vehicle and the lens.

17. A head lamp comprising:
the multi-array LED chip for a vehicle of claim 8; and
a lens installed on a light emission line of light emitted from the multi-array LED chip for a vehicle.

18. The head lamp of claim 17, wherein the lens is an aspherical lens.

19. The head lamp of claim 17, further comprising:
a primary optic installed on the light emission line between the multi-array LED chip for a vehicle and the lens.

\* \* \* \* \*